INVENTOR
JACOB FREDERIK KLINKHAMER
BY Frank R. Jifani
AGENT 3,015,697

ARRANGEMENT IN AUTOMATIC SIGNALLING SYSTEMS FOR ESTABLISHING SIGNAL CONNECTIONS

Jacob Fredrik Klinkhamer, Eindhoven, Netherlands, assignor to North American Philips Company, Inc., New York, N.Y., a corporation of Delaware Filed Apr. 22, 1957, Ser. No. 654,312
Claims priority, application Netherlands June 5, 1956
5 Claims. (Cl. 179—18)

Figure 1:
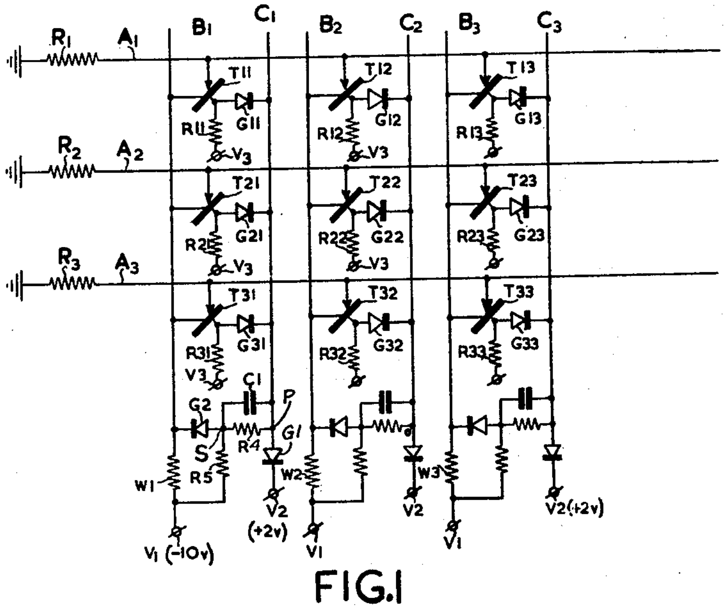

This invention relates to arrangements in automatic signalling systems, for example automatic telephone systems, for establishing signal connections between one of a plurality of conductors of a first group and one of a plurality of conductors of a second group.

In a previous circuit of this type, the main current path of a separate transistor having a current amplification factor greater than unity, is connected between each conductor of the first group and each conductor of the second group. The emitters of the transistors are in this case connected to the conductors of the first group, the collectors are connected to the conductors of the second group, and the base circuits of the transistors each include a resistor. The conductors of the first group are each connected via a resistor to a first terminal of the source of current supply and the conductors of the second group are each connected via a resistor to a second terminal of the source of current supply. Furthermore, means are provided for varying the voltage of one conductor of the first group and one conductor of the second group in such a manner that the transistor connected between said conductors becomes conducting due to the simultaneous occurrence of said voltage variations. In the arrangement of known type, the bases of the transistors are connected by way of a resistor to the emitters. The collector current of such a transistor, which is connected as a dipole, varies as a function of the voltage between the collector and the emitter, a variation similar to the characteristic curve of a gas filled tube. If the voltage exceeds a given limiting value, the transistor becomes conducting and remains conducting, since across the resistor included in the base circuit there occurs a voltage drop such that the junction layer between the emitter and the base is prepolarized in the direction of passage. Known arrangements have the disadvantage that the threshold voltage can usually assume widely different values for different transistors, and the threshold voltage of each transistor is greatly dependent upon temperature and age, so that reliable operation cannot be obtained.

Furthermore, in the known arrangement, a certain amount of crosstalk occurs as a result of the internal coupling between the emitter and the collector of nonconducting transistors.

The present invention mitigates said disadvantages. In the arrangement according to the invention, the bases of the transistors which have their collectors connected to a common conductor, are coupled to a common point. This common point is connected via a first rectifier to a point of constant potential and is connected via a second rectifier, in series with a resistor, to the conductor concerned. Biasing potentials are supplied to the rectifiers by way of further resistors in such a manner that the first rectifier is conductive both in the rest condition of the circuit and if one of the corresponding transistors is conducting, but is temporarily conductive when the voltage of the corresponding conductor is varied to make a transistor conducting. In this condition the second rectifier is conducting, whereas the second rectifier is nonconductive when one of the transistors is conducting.

Figure 2:
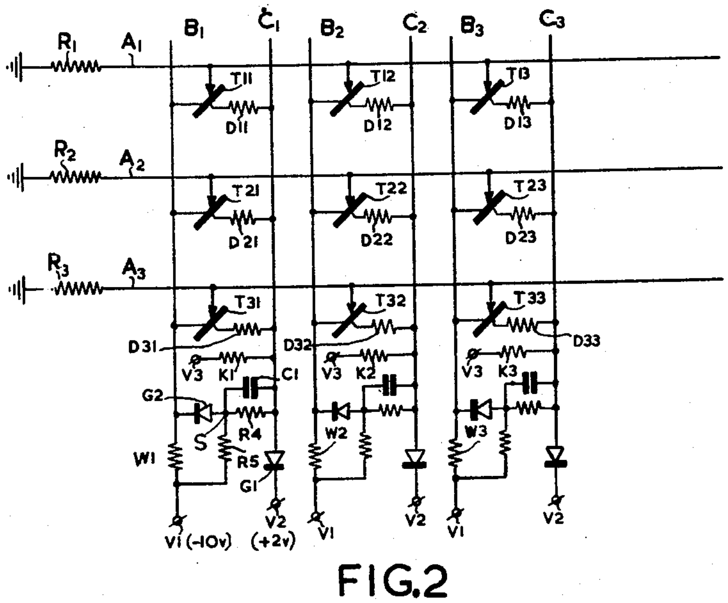

In order that the invention may be readily carried into effect, two embodiments will now be described more fully, by way of example, with reference to the accompanying drawing, in which:

FIG. 1 is a schematic diagram of an automatic signalling system according to one embodiment of the invention; and FIG. 2 is a schematic diagram of another embodiment of the invention.

In the arrangement shown in FIG. 1, the main current paths of transistors T11, T12, T13, T21, T22, etc. are included between a plurality of inlet conductors A1, A2, A3 and a plurality of outlet conductors B1, B2, B3, the emitters being connected to the inlet conductors A1, A2, A3 and the collectors being connected to the outlet conductors B1, B2, B3. The inlet conductors A1, A2, A3 are connected to electrical ground by way of resistors R1, R2, R3, whereas the outlet conductors B1, B2, B3 are connected by way of resistors W1, W2, W3, to a voltage source V1 having a voltage of, for example, −10 volts with respect to ground. The bases of transistors which have their collectors connected to a common outlet conductor, such, for example, as T11, T21, T31 and T12, T22, T32, etc. are connected by way of rectifiers G11, G21, G31 and G12, G22, G32 to common control conductors C1 and C2, etc., which are each connected via a rectifier, such as rectifier G1, to a voltage source V2, having a voltage of, for example, +2 volts with respect to ground. The bases of the transistors are furthermore connected by way of resistors R11, R12, R21, R31, etc. to a voltage source V3 having a voltage which is higher than that of the voltage source V2, so that said rectifiers G11, G21, G31, G12, G22, G32, and G1 are normally conducting and the bases of the transistors have a voltage of about +2 volts with respect to ground. The transistors are normally nonconductive, since the voltage of the bases is higher than that of the emitters and the collectors (assuming that the transistors are of the PNP type). Between each outlet conductors B1, B2, B3 and the associated control conductors C1, C2, and C3 there is included the series-combination of a rectifier G2 and a resistor R4, bridged by a capacitor C1, the junction S of the rectifier G2 and the resistor R4 being connected via a resistor R5 to the voltage source V1. The rectifier G2 thus acquires a bias potential such that it is normally conducting.

The inlet conductors A1, A2, A3 and the outlet conductors B1, B2, B3 are connected by galvanic, capacitive or transformer means to further connecting means (not shown), such as, for example, to other connecting devices of the type illustrated in FIG. 1. To establish a speech connection between one inlet conductor, for example A2, and one outlet conductor, for example B1, the voltage of the inlet conductor A2 is increased by about 1.5 volts and the voltage of the outlet conductor is decreased by galvanic, transformer or capacitive means (not shown) in a manner such that the voltage of point P decreases to +0.5 volt. The voltage of the emitters of the transistors T22, T23, T11 and T31, which are coupled to these conductors, remains negative with respect to that of the bases, so that said transistors remain nonconductive. However, the voltage of the emitter of transistor T21 becomes positive with respect to that of the base, so that this transistor becomes conducting and a current path is closed from ground by way of resistor R2, conductor A2, the emitter-collector current path of transistor T21, conductor B1 and resistor W1 to the voltage source V1. The various electrodes of transistor T21 then assume a voltage of about −5 volts. Since the current amplification factor of the transistors is greater than unity, the collector current is greater than the emitter current and the difference current flowing via the base brings about a voltage drop across resistor R21 such that the base voltage of transistor T21 is slightly negative with respect to the emitter voltage so that rectifier G21 is nonconducting and the transistor T21 remains conducting. Resistor R21 has a high value, so that it effects only slight damping of the speech currents. Rectifier G2 is now nonconductive, since the voltage of conductor B1 is approximately —5 volts and the voltage of point S is approximately —7 volts, so that the signal currents cannot be damped by this means either. Thus, the desired speech connection between the conductors A1 and B2 via the transistor T21 has been established. The voltage drop across resistor R2 prevents one of the other transistors T22 and T23 coupled to conductor A2 from becoming conducting, since the voltage on the emitters of transistors T22 and T23 is strongly negative with respect to the bases. Similarly, the voltage drop across the resistor W1 prevents one of other transistors T11 and T31 connected to conductor B1 from becoming conducting, since rectifier G2 is now nonconductive. Since the rectifiers G11, G31, G22 and G23, together with the rectifier G1, are conducting in this condition, the bases of the transistors T11, T31, T22 and T23 are connected to ground for speech currents via a low impedance path, so that cross-talk, for example from conductor B1 on conductor A1, or conversely, cannot occur via said rectifiers. Interruption of the connection when a call is over may be effected, for example, by supplying either a positive pulse to conductor B1 or a negative pulse to conductor A2. In other words, in the preceding example, in the initial condition, the bases of all transistors have a potential of +2 volts due to the conduction of the rectifier G1 and the rectifiers connected to the bases. The emitters of all transistors are at 0 volt since no current flows through the resistors R1, R2, or R3. The emitters of all transistors thus have a reverse bias, and none of the transistors is conductive.

When the voltage on conductor $A_2$ is raised to +1.5 v., and the voltage at point P (i.e. conductor C1) is lowered to +0.5 v. in order to establish a signal path between conductors $A_2$ and $B_1$, the rectifier G1 will become nonconductive, but the rectifiers G11, G21 and G13 will remain conductive since $V_3$ is more positive than +0.5 v. The bases of transistors T11, T21 and T31 thus assume a potential of +0.5 v. The potentials of the bases of the remaining transistors remain at +2 v. Since the conductor $A_2$ now has a potential of +1.5 v., the emitters of transistors T21, T22 and T23 assume potentials of +1.5 v. This potential is positive only with respect to the base voltage (+0.5 v.) of transistor T21, since the bases of transistors T22 and T23 are still at +2 v. The emitters of the transistors connected to conductors $A_1$ and $A_3$ are still at ground potential, and therefore these transistors remain nonconductive. Thus, only transistor T21 becomes conductive.

When transistor T21 becomes conductive, the emitter-collector current flow of this transistor produces a voltage drop of about 5 volts across resistor $W_1$, and the electrodes of transistor T21 all assume voltages of about —5 v. This voltage, which is also applied to the collectors of T11 and T31, is insufficient for the transistors T11 and T31 to be triggered by subsequent application of triggering voltages, and hence transistors T11 and T31 remain nonconductive as long as transistor T21 is conductive. Since the voltage on conductor $A_2$ is now about —5 volts due to the conduction of transistor T21, the emitters of transistors T22 and T23 have reverse bias that is sufficiently large that they can not be rendered conductive by an increase in the voltage of conductor $A_2$ of only 1.5 volts. The arrangement shown in FIG. 1 requires an individual rectifier for each transistor. The arrangement shown in FIG. 2 substantially corresponds to that shown in FIG. 1, corresponding elements being indicated therein by the same reference numerals. However the bases of the transistors are, in this case, connected by way of resistors D11, D21, D31, D12, D22, etc. to the control-conductors C1, C2 and C3, which are connected via resistors K1, K2 and K3 to the positive voltage source V3. The control conductors are also connected in a similar manner via rectifier G1 to the voltage source V2 and via rectifier G2, resistor R4 and capacitor C1 to the outlet conductors B1, B2 and B3. As before, in the rest condition, as a result of the current flowing via resistor K1, the rectifier G1 is conducting and the bases have a voltage of +2 volts with respect to earth. One transistor, for example T21, is made conducting in a similar way by increasing the voltage of one of the inlet conductors and decreasing the voltage on one of the outlet conductors, the collector and the base of transistor T21 assuming a voltage of about —5 volts and a base current flowing via resistor D21, such that transistor T21 remains conducting. The presence of resistors D11, D31, D22 and D23, by which the bases of the transistors T11, T31, T22 and T23 are connected via rectifier G1 to the voltage source V2, prevents cross-talk via said transistors due to a voltage division occurring between the internal resistances constituted by the junction layers and said resistors, the impedance of the junction layers being high with respect to said resistors.

What is claimed is:

1. An automatic signalling system comprising a first group of a plurality of conductors, a second group of a plurality of conductors, a plurality of transistors each having emitter, collector and base electrodes, means connecting said emitter, electrodes respectively to the conductors of said first group, means connecting said collector electrodes respectively to the conductors of said second group, means for biasing the electrodes of said transistors to render the emitter collector paths thereof normally nonconducting, means for varying the voltage of one or more of said conductors to cause a selected one of said transistors to become conductive through the emitter-collector path thereof, a plurality of electrical terminals respectively associated with each conductor of said second group, means respectively connecting each of said terminals to the base electrodes of all of the transistors which have their collector electrodes connected to the associated conductor of said second group, a plurality of first rectifiers connected respectively between said terminals and a point of constant potential, and a plurality of networks each comprising a rectifier and a resistor connected in series and a capacitor connected across said resistor, said networks being connected respectively between each of said terminals and the associated conductor of said second group.

2. A system as claimed in claim 1, in which the last-named means comprises a plurality of rectifiers respectively connected between the base electrode of each transistor and the terminal which is associated with the conductor to which the collector of the transistor is connected.

3. A system as claimed in claim 1, in which the last-named means comprises a plurality of resistors respectively connected between the base electrode of each transistor and the terminal which is associated with the conductor to which the collector of the transistor is connected.

4. An automatic signalling system comprising a plurality of first conductors and a plurality of second conductors, a plurality of transistors each having an emitter electrode connected to one of said first conductors and a collector electrode connected to one of said second conductors so that each first conductor is connected to each second conductor by way of the emitter-collector path of a separate transistor, a separate terminal corresponding to each of said second conductors and being connected to said corresponding second conductor by way of serially connected first rectifier and first resistor means, a first source of constant potential, separate second rectifier means connected between said source and each of said terminals, a second source of constant potential, separate third resistance means connecting said second source to each of said second conductors, separate fourth resistor means connecting said second source to the junction of each said first resistor and first rectifier means, and means connecting the base electrode of each transistor to the terminal corresponding to the second conductor to which the collector of the respective transistor is connected.

5. An automatic signalling system comprising a plurality of first conductors and a plurality of second conductors, a plurality of transistors each having an emitter electrode connected to one of said first conductors and a collector electrode connected to one of said second conductors so that each first conductor is connected to each second conductor by way of the emitter-collector path of a separate transistor, a source of constant potential, separate first resistance means connecting each first conductor to a first terminal of said source, separate second resistance means connecting each second conductor to a second terminal of said source, separate control conductor means connected to each second conductor by way of serially connected first rectifier means and third resistance means, separate fourth resistance means connecting each junction of said third resistance means and first rectifier means to said second terminal of said source, separate second rectifier means connecting each said control conductor means to a third terminal of said source, and means connecting the base of each transistor to the control conductor connected to the second conductor to which the collector electrode of the respective transistor is connected.

References Cited in the file of this patent

UNITED STATES PATENTS

| | | |
|---|---|---|
| 2,594,389 | Bruce | Apr. 29, 1952 |
| 2,694,753 | Den Hertog | Nov. 16, 1954 |
| 2,729,705 | Faulkner | Jan. 3, 1956 |
| 2,739,187 | Holden | Mar. 20, 1956 |
| 2,876,285 | Bjornson et al. | Mar. 3, 1959 |